United States Patent Office 3,245,197
Patented Apr. 12, 1966

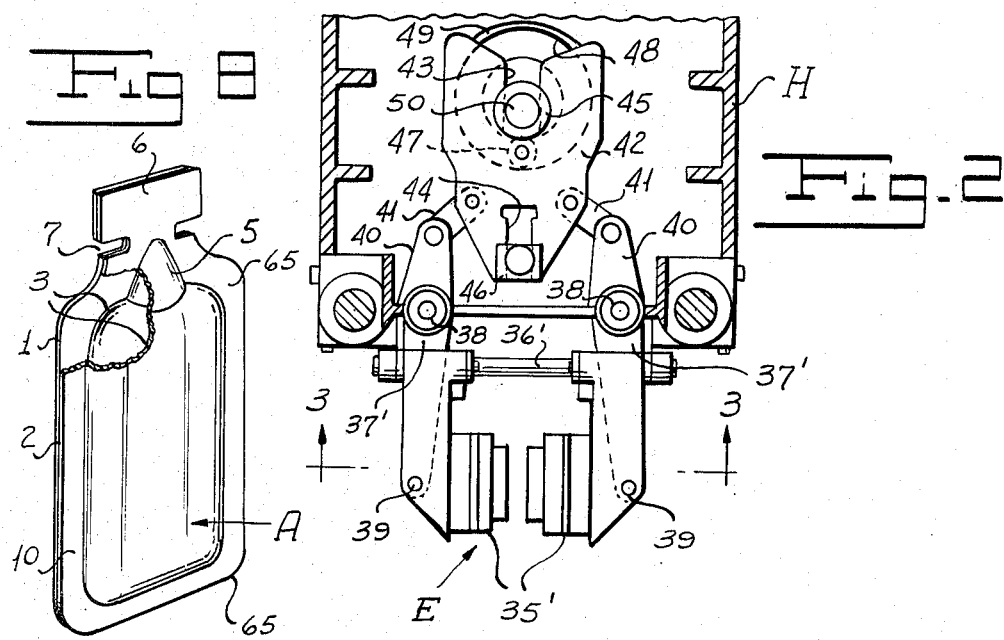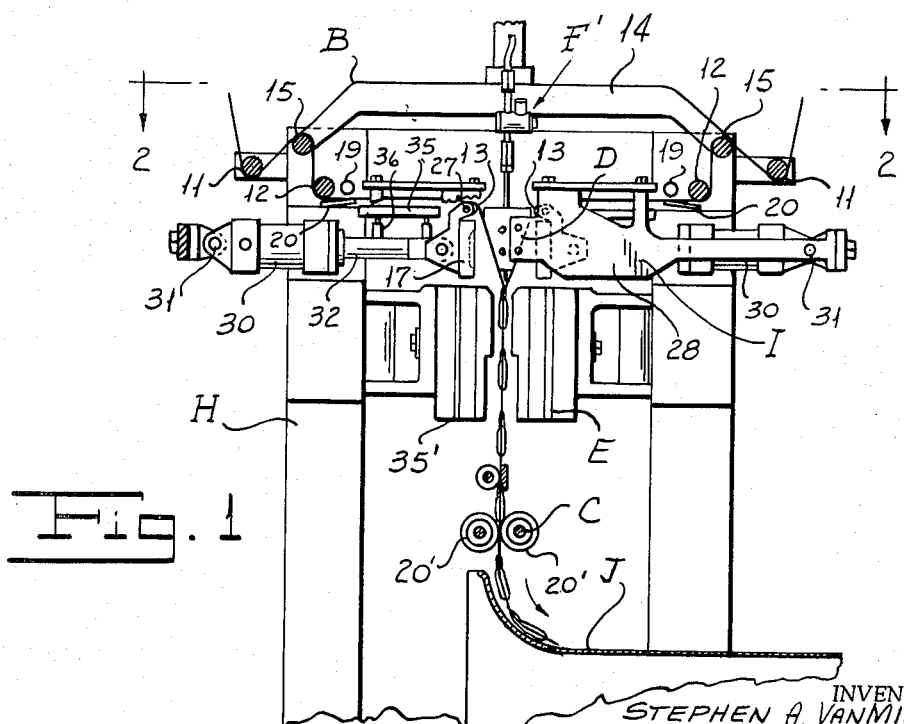

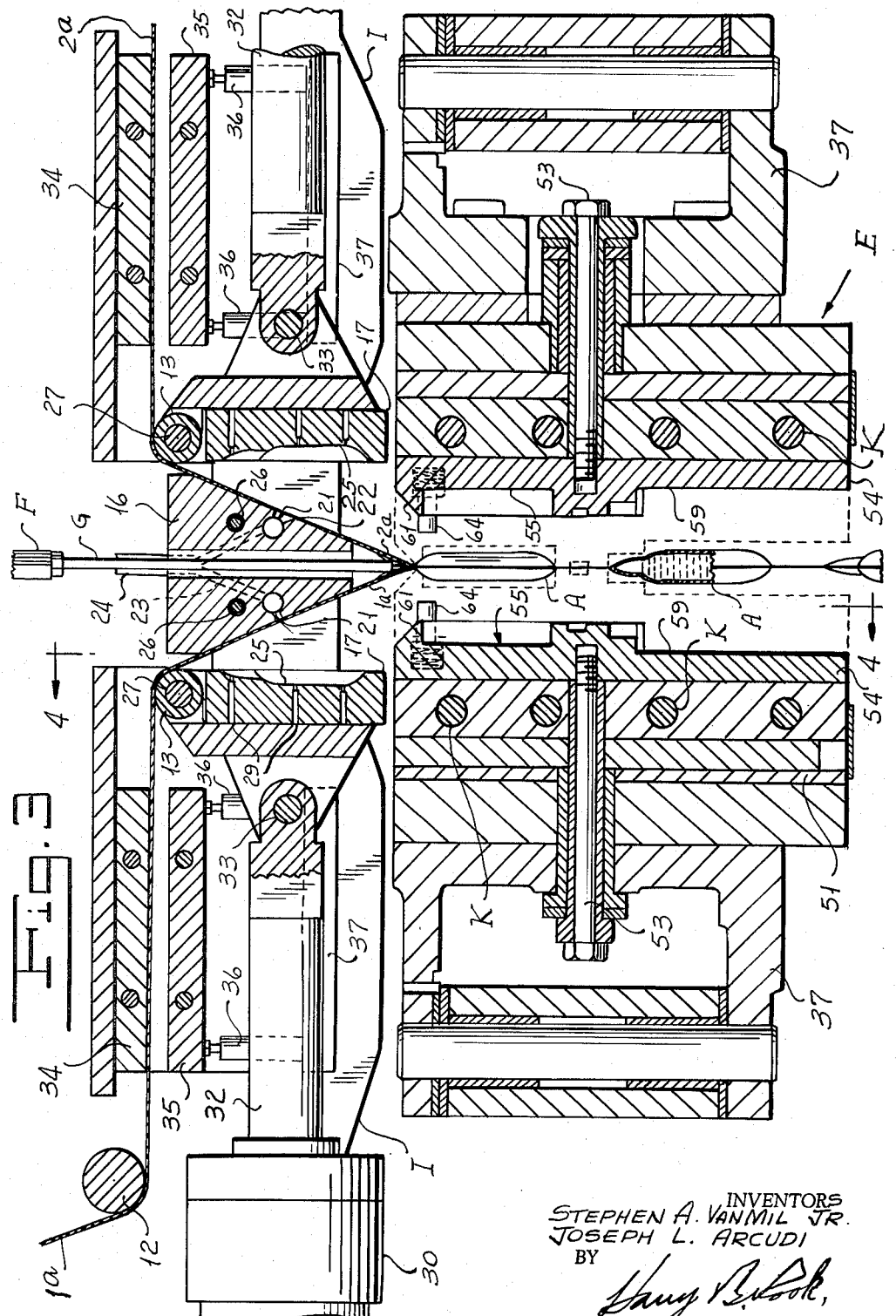

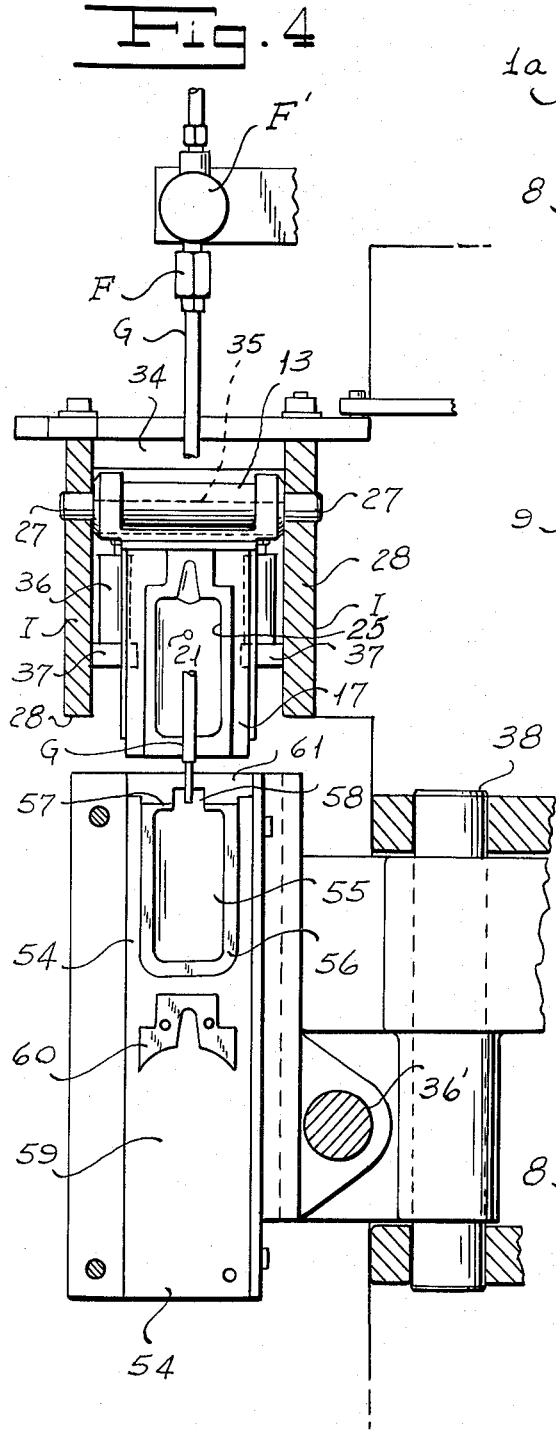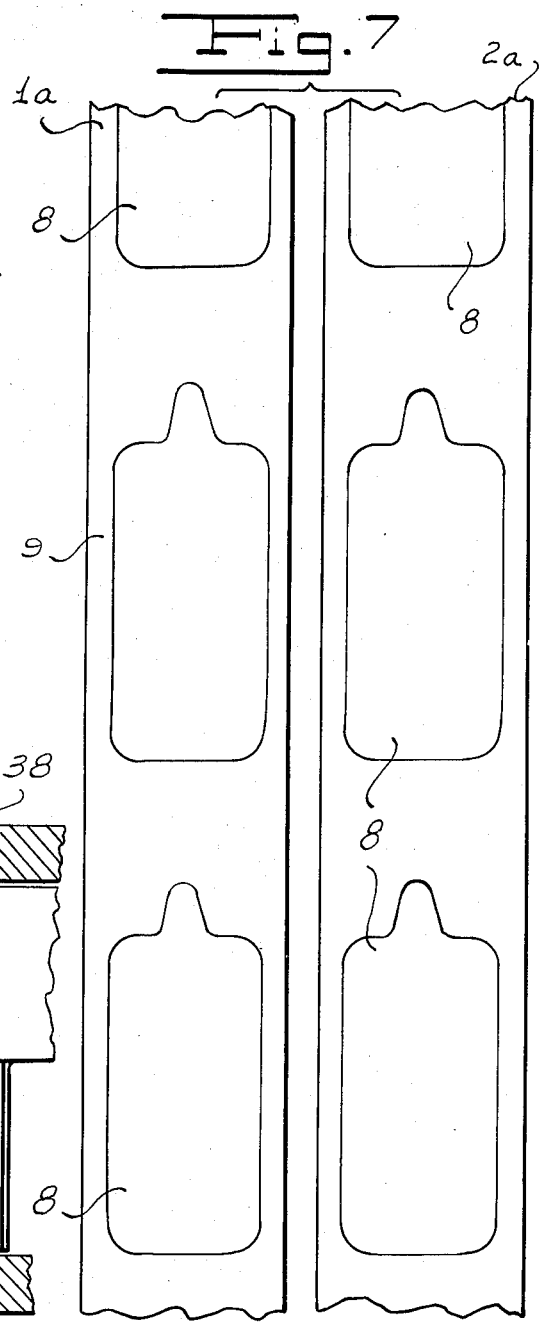

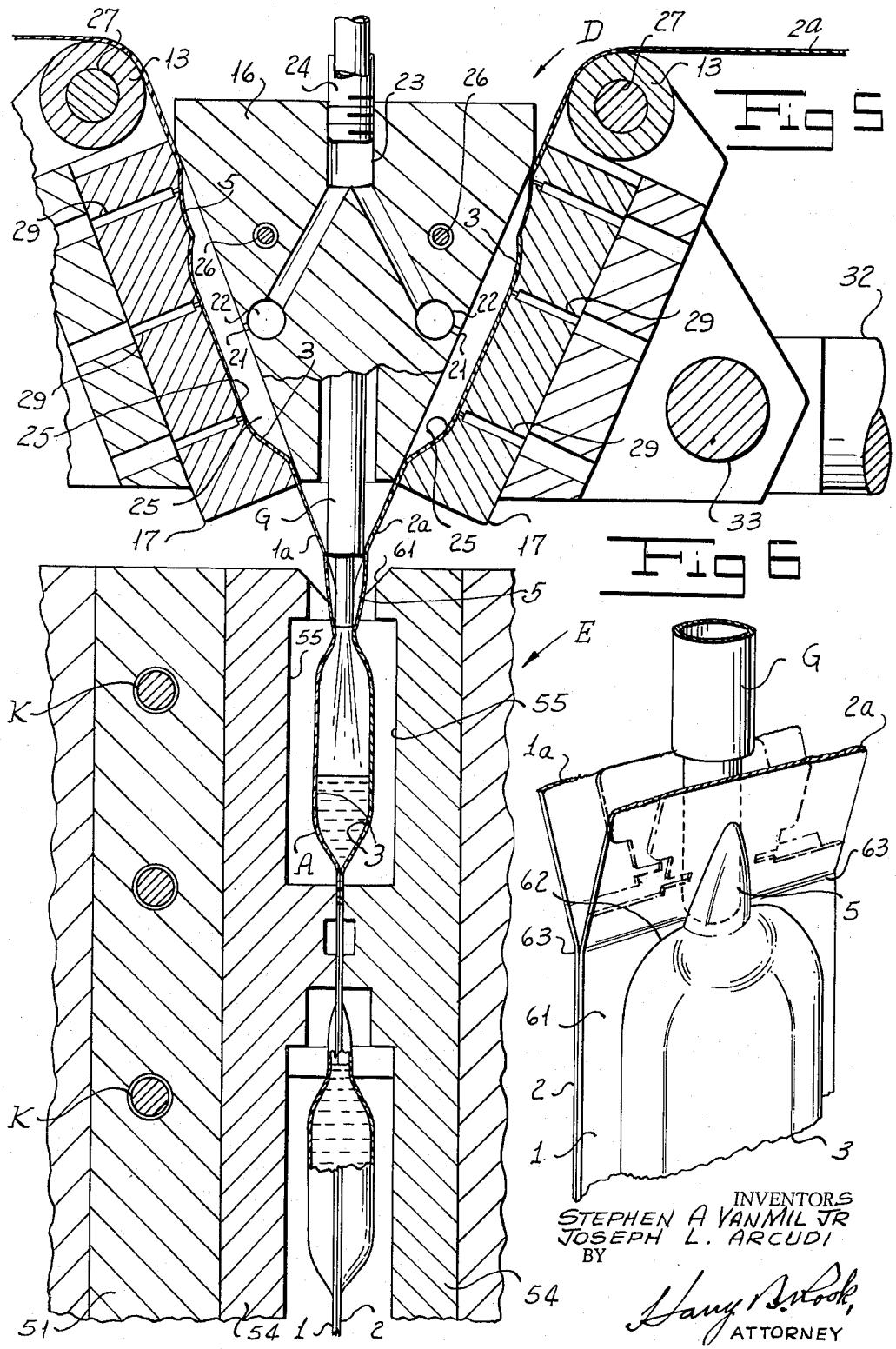

3,245,197
METHOD AND MACHINE FOR MAKING A PACKAGE FROM FLEXIBLE SHEET MATERIAL
Stephen A. Van Mil, Jr., Union, and Joseph L. Arcudi, Elizabeth, N.J., assignors to Ivers-Lee Company, Newark, N.J., a corporation of Delaware
Filed Aug. 20, 1962, Ser. No. 218,006
5 Claims. (Cl. 53—28)

This invention relates in general to the manufacture of lined dispensing packages of the general type disclosed in the co-pending application of Stephen A. Van Mil, Jr., and Joseph L. Arcudi, filed June 14, 1962, Serial No. 202,620. The package is a container for dispensing either fluent substances or articles, for example, liquids such as cod liver oil, nose drops, or the like, or paste or powder, or tablets or pills, the package comprising at least two flexible strips or webs of packaging material that are preformed or molded to provide recesses and are sealed together in zones bounding said recesses so that the recessed portions complement each other in forming the compartment for the substances or articles. Hereinafter, the word "commodity" will be used to include both fluent substances and solid articles such as tablets.

A primary object of the invention is to provide a novel and improved method and machine for making packages of this general type with portions of the walls of the compartment that contact with the commodity or articles in the compartment non-porous and inert to the commodity to prevent evaporation thereof and influx of extraneous foreign material and also to avoid contamination of the packaged commodity by the packaging material.

Another object of the invention is to provide a method and machine whereby packages having three dimensions, for example, to simulate vials, are formed and the commodity is deposited into the compartments in succession in a continuous operation and in a novel and improved way.

Still another object is to provide such a method and machine wherein two strips of inexpensive and normally porous material have spaced zones to form the walls of the package compartment coated with a material such as silicone to provide a non-porous wall portion, and thereafter said zones of the strips are pressure molded to provide the recesses for forming the compartments, the two strips are brought into juxtaposition to each other and portions thereof extending partially around the margins of the recesses are sealed together to partially form each compartment and leave a filling opening for the insertion of the commodity into the compartment, and thereafter the strips are sealed together to close said filling opening and completely seal the compartment.

It is a further object to provide such a method and machine wherein the pressure molded strips are sealed together to partially complete the compartment and in partially surrounding relation to the end of a filling tube for the commodity providing a filling opening through which the commodity is deposited in the compartment and thereafter the strips are moved away from the filling tube and sealed together to complete sealing of the compartment.

Other objects, advantages and results of the invention will be brought out by the following description in conjunction with the accompanying drawings in which FIGURE 1 is a fragmentary schematic front elevation of a machine embodying the invention;

FIGURE 2 is a horizontal sectional view approximately on the plane of the line 2—2 of FIGURE 1, with portions omitted for clearness in illustration;

FIGURE 3 is an enlarged vertical sectional view approximately on the plane of the line 3—3 of FIGURE 2, showing the pressure mold members and the sealing jaws in open position;

FIGURE 4 is a vertical sectional view approximately on the plane of the line 4—4 of FIGURE 3;

FIGURE 5 is a further enlarged vertical sectional view similar to FIGURE 3 but showing the mold members and the sealing jaws in molding and package sealing position, respectively;

FIGURE 6 is an enlarged fragmentary perspective view of the filling end of a partially completed package, showing the end of the filling tube in the filling opening of the package;

FIGURE 7 is a composite plan view of the two strips of packaging material having the zones of coated material applied thereto; and FIGURE 8 is a perspective view of one type of package produced in accordance with the invention, showing portions broken away for clearness in illustration.

For the purpose of illustrating the principles of the invention, a method and machine for packaging a fluent substance has been illustrated, although it should be understood that the method and machine may be utilized for producing packages of many different shapes and materials for packaging different fluent substances and articles.

The package here shown comprises two layers 1 and 2 of moldable materials that have inherent ability to stretch, each layer having a recess 3 pressure molded in one side thereof with its boundaries spaced from the margins of the respective layer and which are of the desired shape, in the present instance, approximately rectangular in plan, and have at one end the respective extension recess 5 whose boundaries are also spaced from the edges of the layers 1 and 2; and in the present case, the edges of the layers have extensions 6 between which and the recess 3 are notches 7 disposed between the corresponding recesses 3 and the ends of the corresponding extension recesses 5. The concave or inner surface of each recess and extension recess preferably has a coating or film of a non-pervious substance that is also inert to the substance to be packaged.

In accordance with the invention, the packages are formed in a continuous operation and the respective layers 1 and 2 comprise portions of continuous strips or webs 1a and 2a each of which has equidistantly spaced zones 8 provided with the above-mentioned coating or film of silicone or the like, the contours of each zone corresponding to the shape of the inner surface of the corresponding recess 3 and extension recess 5 and the margins of the layers 1 and 2 extending outwardly from the boundaries of said zones as indicated at 9.

The two layers 1 and 2 of each package are heat-sealed together, for example, between heated dies, with or without crimping, in flat zones 10 bounding the recesses so as to provide a compartment A. Initially only the portions of the layers bounding the recesses 3 are sealed together so as to leave the remaining portion of the layers unsealed to provide a filling opening for the deposit of a commodity such as a liquid, paste or powder, into the compartment; and after the filling operation, said unsealed portions are heat-sealed together to close the filling opening and complete the package, the extension recesses 5 then forming a restricted discharge neck for the compartment which may be opened by tearing the layers across the discharge neck between the notches 7 to discharge the commodity from the compartment.

Describing the method in its broader aspects, the two strips of packaging material are drawn step by step from supply rolls (not shown) into juxtaposition or side-byside relation by a suitable feeding mechanism generally designated B and mounted on a main frame H, which may be, for example, of the type shown in United States Patents Nos. 2,245,823 or 2,350,930. This feeding mechanism draws at each step from the rolls predetermined quantities of the strips required form a single package, and an auxiliary feeding mechanism C constantly exerts tension on the strips as as to draw said quantities of strips downwardly in proper relation to pressure molding mechanism D for forming the recesses 3 and 5 and package sealing mechanism E which is associated with a package filling mechanism F that includes a stationary filling tube G for depositing the fluent substance in the package and having its discharge end so disposed with respect to the sealing mechanism that the strips are sealed together in partially bounding relation to the recesses 3 while they are at rest at the end of one step of movement leaving a filling opening between the strips, with the discharge end of said filling tube disposed between the unsealed portions of the strips and in said filling opening whereupon while the strips are at rest a predetermined quantity of the substance to be packaged is injected into the package compartment under control of a suitable valve mechanism F'; and at the end of the next step of movement of the strips, said unsealed portions of the strips are sealed together to close said filling opening and complete the package.

The feeding mechanism is shown as comprising two guide rollers 11 on the machine frame H under which the respective strips 1a and 2a pass from the supply rolls and to idler rollers 12, one between each roller 11 and one of a pair of guide rollers 13. A yoke 14 is mounted on a vertically reciprocable shaft 14' that has a strip-pulling roller 15 disposed between the guide roller 11 and idler roller 12 at each side of the machine. Each strip of packaging material is led from the corresponding supply roll under the corresponding guide roller 11 over the corresponding pulling roller 15 under the corresponding idler roller 12 and thence over the corresponding guide roller 13, the two strips thus being brought into juxtaposition at opposite sides of the filling tube and a fixed mold member 16 of a pressure mold which also includes a movable mold member 17 coactive with each side or mold face of the fixed member and disposed at the side of the corresponding packaging strip opposite the fixed member.

Between the rollers 12 and 13 is a suitable brake mechanism that is shown as comprising a soft non-rotatable bar 19 normally influenced by a spring (not shown) toward a brake platen 20 so as to positively clamp the corresponding strip 1a or 2a between the bar and the platen and hold the strip against longitudinal movement, so that periodically the strips are held against longitudinal movement by the brakes, when the yoke 14 is at its lower limit of the stroke and during upward movement of the yoke so that a predetermined length of each strip required to form a package would be withdrawn from the corresponding roll. Then the bars 19 are actuated upwardly to disengage them from the corresponding strips after which the yoke 14 is lowered and simultaneously the auxiliary feeding means C draws the strips downwardly through the sealing mechanism as best shown in FIGURE 1. Preferably the auxiliary feeding means C comprises two resilient rollers 20', one at each side of the package strip so that the rollers yieldingly grip the strip between them. The rollers are driven in any suitable manner, for example, as are the corresponding auxiliary feeding means shown in Patents Nos. 2,350,930 and 2,245,827.

Now more specifically describing the pressure molding mechanism D and with particular reference to FIGURES 3, 4 and 5, the stationary mold member 16 is mounted on brackets I that are secured on and extend forwardly from the front of the main frame H above the package sealing mechanism E. As shown, the stationary member 16 is wedge-shaped and has its narrow side facing downwardly and each of its two opposed inclined side or mold faces facing toward the mold face of one of the movable mold members 17. The stationary member has a plurality of air outlet apertures 21 opening through each of its opposed inclined surfaces and connected to ducts 22 which are in turn connected by the respective passages 23 to an air supply pipe 24 which is connected to any suitable source of air under pressure controlled by suitable valve mechanism L so that at the proper intervals, in timed relation to the movement of the movable members 17, jets of air are ejected from the outlets 21 against the corresponding packaging strips 1a or 2a and thereby force the strips into contact with the mold faces 25 of the movable members that form mold cavities. Obviously the cavities are of a size and shape corresponding to the recesses 3 and the extension recesses 5. Preferably electrical heaters 26 are also provided in the stationary member 16 to keep the packaging strips at the proper temperature for pressure molding.

Each movable member 17 is pivotally mounted on a rod 27 which also serves as the general support for one of the rollers 13, the ends of the rod being supported in the side plates 28 of the corresponding bracket I; and normally the movable members are swung downwardly away from the stationary member as shown in FIGURE 3.

Periodically at the end of each step of movement of the strips, the movable members are swung into fluid tight contact with the packaging strips and grips the strips between the stationary member and the movable members, at which time the jets of air are ejected through the outlets 21 so as to pressure mold the strips into the cavities 25 of the movable members as shown in FIGURE 5. The movable members have air vents 29 to permit the escape of air as the strips are pressed into the cavities.

For so moving the movable members, there has been shown a hydraulic cylinder 30 for each movable member pivotally mounted at one end 31 of the corresponding bracket I and having its piston rod 32 pivotally connected at 33 to the corresponding movable member. Flow of liquid to and from the cylinders is controlled by automatically operated valves in any suitable manner in timed relation to the movement of the strips 1a and 2a.

When certain types of synthetic plastic materials are utilized for the packaging strips, it is desirable to preheat the portions of the strips that are to be pressure molded, and this may be accomplished by mounting a stationary heating plate 34 on the corresponding bracket above the strip of packaging material to coact with a movable feeding plate 35 that is carried by hydraulic devices 36 which are supported by shelves 37 projecting inwardly from the plates 28 as shown in FIGURE 4, said hydraulic devices being connected to a source of valve controlled hydraulic pressure so that in the proper timed relation to the movement of the strips, the heating plates 35 will be moved into contact with the strips so as to press the strips between the two heating plates and thereby heat the strips.

The sealing mechanism E is shown as including two sealing jaws 35' that are mounted to reciprocate toward and from each other in a horizontal plane and are guided in accurate alignment with each other during their movements by guide rods 36' (FIGURE 2) each of which is mounted in one of the jaws and is slidable in openings in the other jaw. Each jaw is carried by an arm 37' which is rotatably mounted on a vertical shaft 38 supported in the main frame H, the arm being pivotally connected to the jaw at 39. These arms are simultaneously oscillated to move the jaws automatically toward and from each other by the respective crank arms 40 connected by links 41 to a slide 42 that has slots 43 and 44 which slidably engage the respective guide blocks 45 and 46. The slide carries a roller 47 that follows a cam groove 48 in a disc 49 which is keyed on a main drive shaft 50.

The two jaws are substantially identical in construction and each includes a body portion 51 and a sealing block 54 that are mounted on the corresponding arm 37' in any suitable manner, as by cap screws 53. Preferably one of the body portions is so mounted that it will resiliently yield relatively to the other sealing block when the blocks are in sealing position to provide even sealing pressure.

Each block has a recess 55 on its face which is surrounded on three sides by a sealing rim 56 which is preferably flat and may be smooth or serrated. Where the package is to be approximately rectangular in shape as shown, the rim 56 is arranged in a manner corresponding to the three sides of the rectangular recess 3 as best shown in FIGURE 4, and in addition the block has rim portions 57 that extend inwardly from the rim portions 56 to a notch or cut-away portion 58 that provides a clearance for the extension recess 5 of the package. Below the rim 56 each sealing block has a recess or cut-away portion 59 to provide a clearance for the compartment and the discharge neck of the package, and above said cut-away portion is a sealing rim 60 the dimensions and shape of which correspond approximately to the dimensions and shape of the upper end of the package adjacent the discharge neck and the extension 6 beyond the notches 7; the lower edge of the sealing rim 60 also being arranged so as to overlap the portion of the package surrounded by the sealing rim extensions 57 during the sealing operation.

In forming the packages, the sealing blocks are first separated as shown in solid lines in FIGURES 1 and 3, and the packaging strips are pulled downwardly in converging relation to each other from the pressure molding mechanism into position between the sealing blocks. Thereupon the sealing blocks are moved toward each other so as to cause the sealing surfaces 56 and 57 to press the strips together to form the zones 61 and 62 best shown in FIGURE 6, and thereby partially fabricate a package having its upper and open between the strips at the upper ends of the sealing blocks, the rim extensions 57 permitting the packaging strips to bend outwardly along the lines 63 close to the juncture of the main recesses and the extension recesses so that the upper portions of the strips can be spread apart without permanent distortion of the walls of either the main recesses or the extension recesses to provide a clearance for the lower end of the filling tube G as shown in FIGURES 5 and 6 so as to form a filling opening.

It will be understood that where the packaging material is heat-sealable, the sealing blocks 54 will be heated in any suitable known manner, for example, by electric heaters K, inserted in the body portions of the sealing jaws; and where some form of cold sealing adhesive is utilized, the heaters are, of course, omitted or de-energized.

At this point, the fluent substance being packaged is deposited into the package compartment A, a predetermined quantity of the liquid being dispensed by suitable mechanism including, for example, an automatically controlled electromagnetic valve F' which is opened in timed relation to the sealing of the packaging strips between the sealing rims 56 of the two sealing blocks. It will be noted that the upper ends of the sealing blocks are cut-away at 61 to provide a clearance for the filling tube and for the outwardly bent portions of the packaging strips.

In the meantime, the pressure mold will have been operated to pre-hold the recesses and extension recesses of the next preceding package as shown in the upper portion of FIGURE 5, and thereafter the sealing blocks will be separated and the movable members of the pressure mold will have moved away from the stationary member so as to displace the molded strips from the movable mold members and permit longitudinal movement of the strips and the partially formed and filled package one step downwardly to bring the partially formed package into position to be completely sealed by the sealing surface 60 upon the next movement of the sealing blocks together as shown at the lower portion of FIGURE 5.

In some instances, it may be desirable to provide spring biased stripping pins 64 on the upper ends of the sealing blocks to push the sealing strips out of contact with the sealing surfaces 56 as the sealing blocks move apart.

The package strip thus formed is continually pulled downwardly by the auxiliary feeding mechanism C and slides along an apron or other suitable receiving surface J, and thereafter the package strip is passed through a die-cutting machine which cuts the strips to form the notches 7 and the cap-shaped extension 6 as well as the rounded corners 65 on the outer edges of the sealed zone 10, and also to sever the individual packages from the strip.

It will be understood that where the machines are to be utilized for packaging solid articles, a known type of feeding mechanism for depositing solid articles in a compartment or package will be used in place of the liquid-controlling valve F'; and a plurality of the articles may be deposited in each package compartment or the articles may be deposited singly in each compartment.

We claim:

1. The method of making packages in succession from continuous strips of material and filling them with a commodity through a vertically disposed filling tube, said method comprising feeding two continuous strips of pressure-moldable inherently resilient self-sustaining packaging material and pulling them step-by-step downwardly longitudinally in spaced opposed relation to each other from their leading ends at opposite sides of the discharge end of said filling tube, pressure-molding at least one of said strips at the end of one step of movement and thereby forming a main recess in at least said one strip having a relatively narrow and shallow extension recess joined at one of its ends to the upper end of the main recess and extending upwardly therefrom with the margins of said strips extending beyond said main and extension recesses, then while the strips are at rest at the end of the next step of movement and with the recesses of one strip facing the other strip, sealing said strips together in zones that bound the main recess with their upper ends in close relation to the line of juncture of the main recess and the extension recess and at opposite sides of said extension recess, thereby bending said strips along said line of juncture into transversely spaced apart downwardly converging relation to each other while maintaining the strips unsealed around the said extension recess above said line of juncture and in encircling relation to the discharge end of the filling tube thereby providing a compartment between said strips having a filling opening formed at the juncture of said extension recess with the main recess with the filling tube extending through said filling opening into said compartment, and while the strips are at rest after formation of said compartment depositing a commodity into said compartment through said filling tube and said filling opening, and at the end of a subsequent step of movement sealing said strips together above said line of juncture in zones bounding said extension recess while leaving said strips unsealed at the juncture of said main recess and said extension recess, thereby completing and closing a package having a filled compartment and a discharge neck that is formed at one end of the compartment by said extension recess.

2. A machine for making packages in succession from continuous strips of material and filling them with a commodity, said machine comprising a stationary vertically disposed filling tube for supplying said substance to the packages, a frame, means for feeding two continuous strips of pressure-moldable packaging material approximately vertically downwardly longitudinally step by step at opposite sides of said filling tube, a guide roller for each strip, pressure molding means including a stationary mold member between said strips below said rollers and having opposed mold faces at opposite sides of said filling tube and along which said strips are movable, a movable second mold member coacting with each of said mold faces of the stationary mold member and mounted to move to and from the corresponding stationary mold member face with the corresponding strip between said mold members, means for moving said movable mold members toward and from the respective stationary mold surfaces in timed relation to the step-by-step movement of said strip to grip and release said strips between said stationary and movable mold members, means for injecting fluid under pressure between the mold faces of said stationary mold member and the corresponding strips while the strips are gripped between the mold members to pressure-mold said strips and to form a recess in each thereof, means for sealing said strips together while the strips are at rest at the end of one step of movement including two sealing blocks below said mold members one at each side of said strips and said filling tube and having sealing surfaces to seal the strips together in zones bounding said recesses and having cutaway portions in juxtaposition to the discharge end of said filling tube for sealing said strips together in zones bounding said recesses and leaving said strips unsealed at said cut-away portions providing for a filling opening between said unsealed portions of the strips into which extends said filling tube, means for depositing a commodity through said filling tube and said filling opening into said compartment while the strips remain at rest after said sealing operation, means including said sealing blocks for sealing said strips together to close said filling opening at the end of a subsequent step of movement of said strips, and means for moving said sealing blocks toward and from each other in timed relation to the movements of said strips and said movable mold members.

3. A machine for making packages in succession from continuous strips of material and filling them with a commodity, said machine comprising a vertically disposed filling tube for supplying said commodity to the packages, a frame, means on said frame for feeding step-by-step two continuous strips of pressure-moldable packaging material downwardly longitudinally at opposite sides of said filling tube including means for pulling the strips downwardly from their leading ends, a guide roller for each strip journaled on said frame, means below said rollers for pressure molding said strips at the end of one step of movement to form a recess in at least one strip, means for sealing said strips together while they are at rest at the end of the next step of movement comprising two sealing blocks below said pressure molding means relatively movable toward and from each other at opposite sides of the strips and with portions disposed at opposite sides of the discharge end of said filling tube in closely spaced relation thereto, said sealing blocks having sealing surfaces arranged for sealing said strips together in zones bounding the recess and leaving the strips unsealed at one point and in encircling relation to said end of the filling tube providing a compartment between said strips having a filling opening at said unsealed point into which extends said filling tube, means for depositing said commodity through said filling tube and said filling opening into said compartment while the strips remain at rest, and means including said sealing blocks for sealing the strips together to close said filling opening at the end of the next step of feeding of said strips whereby to form a chain of closed packages, and means for moving said sealing blocks in timed relation to the step-by-step movement of said strips, said means for pressure molding said strips comprising a stationary mold member mounted on said frame and having a mold surface for at least one strip disposed between the said filling tube and said strip, a movable second mold member mounted on said frame to move toward and from said molding surface of said stationary mold member to grip and release said strip between said mold members, means for moving said movable mold member in timed relation to the step-by-step movement of said strips to successively grip said one strip between the said stationary mold member and said movable mold member and release the strip therefrom, and means for injecting fluid under pressure between said strip and one of said mold members while the strip is gripped between the mold members to mold said strip and form said recesses, the discharge end of the filling extending into the space between the sealing blocks and the sealing surfaces of the sealing blocks having portions cut away and in spaced relation to said filling tube to prevent the sealing of said strips at said one point and provide the filling opening for the package compartment having the end of the discharge tube extending thereinto.

4. A machine as defined in claim 3 wherein said stationary mold member has a vertical hole between said mold faces through which extends said filling tube.

5. A machine as defined in claim 3 wherein said pressure molding means has a mold cavity, a portion of which to form a main recess and another portion of which is to form an extension recess at one end of said main recess, and said sealing surfaces of the sealing blocks are shaped to initially seal the strips together in bounding relation to the recess and to leave the strips unsealed at the juncture of said main recess and said extension recess and around the latter to form said filling opening, and said sealing blocks also have sealing surfaces to seal the strips together in bounding relation to said extension recess for closing the filling opening.

References Cited by the Examiner

UNITED STATES PATENTS

| | | | |
|---|---|---|---|
| 2,279,505 | 4/1942 | Ravenscroft | 53—28 |
| 2,387,747 | 10/1945 | Cowley | 53—28 |
| 2,712,717 | 7/1955 | Keller | 53—28 X |
| 2,836,291 | 5/1958 | Stroop | 53—28 X |
| 2,886,931 | 5/1959 | Karpowicz | 53—180 X |

FOREIGN PATENTS 1,169,093  12/1958  France.

FRANK E. BAILEY, *Primary Examiner.*

BROMLEY SEELEY, *Examiner.*

W. M. COHEN, S. ABEND, *Assistant Examiners.*